Patented Dec. 15, 1936

2,064,139

UNITED STATES PATENT OFFICE

2,064,139
ADHESIVE

Frank M. Allen, Summit, and Walter S. Egge, East Orange, N. J., assignors to Congoleum-Nairn Inc., a corporation of New York No Drawing. Application February 16, 1935, Serial No. 6,885

2 Claims. (Cl. 134—23.1)

The present invention relates to adhesive compositions for use in the installation of linoleum or similar surface coverings and particularly adapted for the installation of linoleum on walls and ceilings. The object of the invention is to provide an improved adhesive composition which spreads easily but is resistant to flow, has a very high initial tackiness, permanently remains relatively flexible after evaporation of the thinning solvent, is light in color, and is especially adapted for bonding surface coverings such as linoleum, directly to treated or untreated lime plaster walls.

Adhesives heretofore known and used for the installation of linoleum on floors have been found generally unsatisfactory for the installation of linoleum on plaster walls because the conditions involved in wall installations are much more severe than those normally found in floor installations. Thus the adhesive for wall installations must have an exceptionally high initial "tack", should resist the natural tendency of the surface covering to curl at the edges and seams, and should prevent slipping or sagging of the covering due to its own weight. Again, while it is desirable in floor installations that the adhesive set to a hard inflexible film and thus resist surface indentations in the floor covering from heavy objects that may be placed upon it, in wall installations it is necessary that the adhesive permanently remain somewhat flexible so that cracks which not infrequently occur in plaster walls, will not rupture the surface covering. Many adhesives, particularly those of the lignin-water type now largely used in floor installations, shrink considerably upon drying out. Such adhesives cannot successfully be used in bonding linoleum to plaster walls since the bond is so strong and the shrinkage is frequently so great that the plaster wall is broken down internally with consequent loosening of the linoleum covering. Finally, most adhesives for floor installations are dark in color which renders them unsuited for the application of linoleum to walls.

We have discovered and developed an improved adhesive composition which adequately meets the numerous special requirements for the installation of linoleum or similar surface coverings on walls, ceilings, etc. Essentially the adhesive of our invention comprises an oxidized drying oil, a resin or gum, inert filler material, preferably bentonite clay, and a solvent or thinner as for example alcohol. A small amount of lithopone is usually added to lighten the color although this is not necessary. Likewise the addition of a small quantity of asbestos fibre will also be found desirable in facilitating the application of the adhesive to vertical surfaces. Linseed, perilla, and soya bean oils or mixtures thereof, are most suitable for the preparation of the oxidized drying oil component of the adhesive, although other drying oils may be used. The oxidation of the oil is accomplished in the conventional manner by aeration of the oil at a temperature of 140° to 160° F. for a period of fifteen to twenty hours, care being taken to discontinue the oxidation of the oil while it is still completely soluble in alcohol. The resinous material (this term including both resins and gums) may be added in the form of a solution directly to the oxidized oil but in many cases it will be found advantageous to combine the resin or gum with the oil before oxidation and to oxidize the mixture. Small amounts of the usual lead, cobalt, and manganese driers may be added in the preparation of the oil. For the inert filler material experience indicates that bentonite clay is much to be preferred as it substantially increases the adhesiveness of the cement, but satisfactory results may be obtained with other inert fillers such as china clay. By way of illustration we give below several typical formulas (in percentage by weight) for adhesive compositions within the scope of our invention:

I

| | Per cent |
|---|---|
| Oxidized linseed oil (including .5% lead and .2% cobalt driers on metal to oil basis) | 30 |
| Manila gum | 10 |
| China clay | 40 |
| Alcohol | 20 |

II

| | Per cent |
|---|---|
| Oxidized drying oil (mixture comprising four parts linseed oil and one part soya bean oil) | 27 |
| Rosin | 8 |
| Bentonite clay | 40 |
| Alcohol | 25 |

III

| | Per cent |
|---|---|
| Oxidized linseed oil (including 1.2% lead and .003% manganese driers on metal to oil basis) | 35 |
| Rosin | 6 |
| Bentonite clay | 30 |
| Asbestos fibre | 3 |
| Lithopone | 4 |
| Alcohol | 22 |

In preparing Formula III the rosin and driers are added to the linseed oil and the mixture is aerated at 140° F. for eighteen hours.

The proportion of thinner may be varied to give to the adhesive the desired consistency for application either with a brush or trowel. In general, however, one to one and one-half parts by weight of thinner to four parts by weight of the non-volatile constituents will be found to provide a consistency in the adhesive which is best adapted for the installation of linoleum to vertical surfaces.

The improved composition above described fulfills all of the numerous special requirements of an adhesive for the satisfactory application of linoleum or similar surface covering to lime plaster walls, ceilings, etc. It is light in color, spreads easily, and remains exceedingly tacky for a considerable period after application to the wall thus permitting the installation of surface covering without undue haste. It effectively resists any tendency of the covering to slip or sag when once applied. It does not shrink nor break down the plaster wall upon setting and it remains permanently somewhat flexible. It may be applied with brush or trowel. It is waterproof and thus is particularly adapted for the installation of linoleum on walls of bathrooms, kitchens, or other rooms where there may be excessive moisture at intervals.

While we have described a preferred embodiment of our invention, it will be understood that the specific details in formulas hereinbefore set forth are for the purpose of illustration and are not intended to be regarded as limitations upon the scope of our invention except as the same may be restricted by the state of the art or as such specific limitations may be included in the following claims.

We claim:

1. An adhesive composition, adapted for the installation of linoleum or a similar surface covering on plaster walls and ceilings, comprising approximately 27% to 35% of alcohol-soluble oxidized drying oil, approximately 6% to 10% of alcohol-soluble resinous material approximately 35% to 40% of filler material, and sufficient alcohol to give to the mixture a consistency suitable for troweling or brushing.

2. An adhesive composition, adapted for the installation of linoleum or a similar surface covering on plaster walls and ceilings, comprising approximately 27% to 35% of alcohol-soluble oxidized drying oil, approximately 6% to 8% of rosin, approximately 35% to 40% of a filler material including a major proportion of bentonite clay and minor proportions of asbestos fiber and a white pigment, and approximately 25% of alcohol.

FRANK M. ALLEN.
WALTER S. EGGE.